(No Model.)
W. C. SHOWALTER.
MECHANICAL MOTION.
No. 396,003. Patented Jan. 8, 1889.
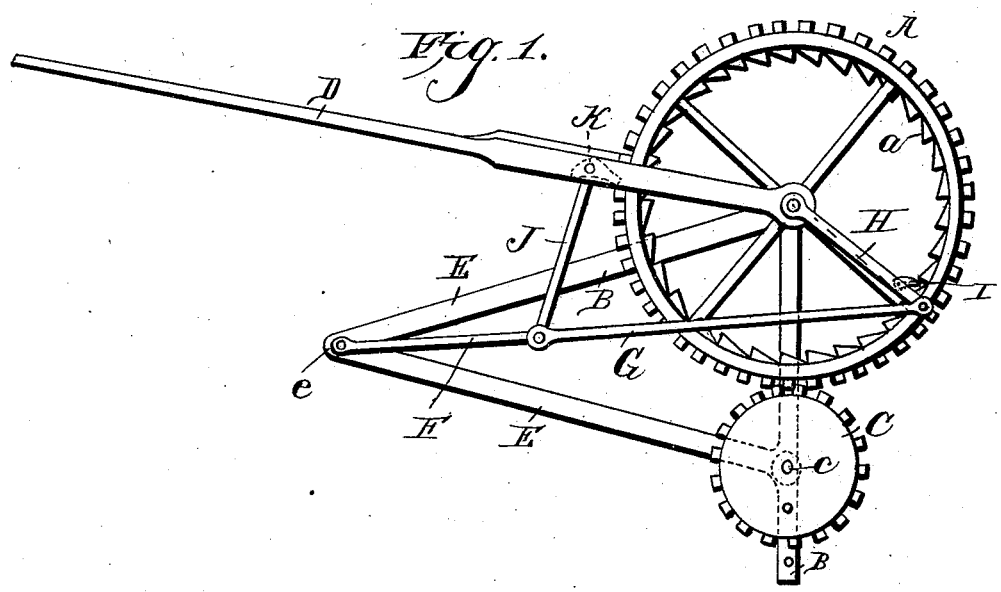
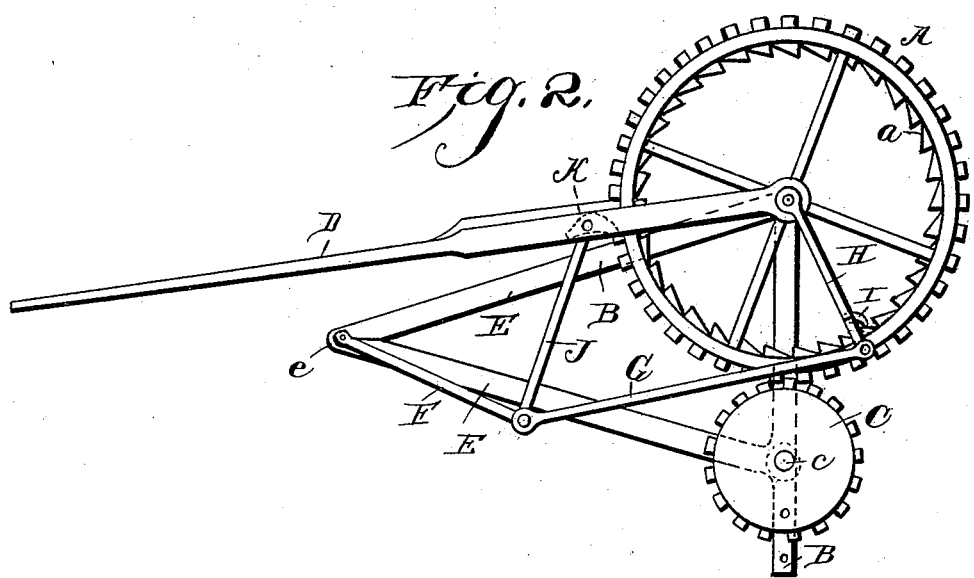
Witnesses,
Henry G. Dieterich
R. W. Bishop
Inventor,
Wasson C. Showalter
By his Attorneys
C. A. Knowles

UNITED STATES PATENT OFFICE.

WASSON C. SHOWALTER, OF LANCASTER, WISCONSIN, ASSIGNOR OF ONE-HALF TO J. H. REED, OF SAME PLACE.

MECHANICAL MOTION.

SPECIFICATION forming part of Letters Patent No. 396,003, dated January 8, 1889.

Application filed February 16, 1888. Serial No. 264,310. (No model.)

*To all whom it may concern:*

Be it known that I, WASSON C. SHOWALTER, a citizen of the United States, residing at Lancaster, in the county of Grant and State of Wisconsin, have invented a new and useful Mechanical Motion, of which the following is a specification.

The invention relates to improvements in mechanical motions, designed to convert reciprocatory motion into circular motion without the intervention of a crank; and it consists in the construction and novel combination of parts, hereinafter described, illustrated in the drawings, and pointed out in the appended claims.

Figure 1 of the drawings is a side view of the device, showing the lever raised; and Fig. 2 is a similar view showing the lever lowered.

Referring to the drawings by letter, A designates the main driving gear-wheel of the machine, having upon the inner face of its outstanding rim a concave ratchet, *a*, and journaled upon a suitable supporting-standard, B.

C is a pinion meshing with said wheel below the same, and secured upon a drive-shaft, *c*, that is mounted in proper supports, (not shown,) and to which suitable belt-driving pulleys may be attached at proper points.

D is a lever bifurcated at its inner portion, which straddles the gear-wheel A, and is pivoted on each side upon the pivotal pin thereof.

E E are arms converging outward from suitable points of the standard B to their point of meeting *e*, upon which is pivoted the outer end of a rod, F, the inner end of which is pivoted to the adjacent end of a rod, G, which has its other end pivoted to the lower end of a link-rod, H, the upper end of which is pivoted upon the shaft of the gear-wheel A.

I is a pawl attached to the link-rod H, and engaging the ratchet *a* in one direction.

J is a link-rod connecting the joint between the rods F and G and the lever D at a point just outside the gear-wheel A, and K is a pawl pivoted to the lever D and engaging the teeth of said gear-wheel in the same direction that the pawl I engages the ratchet *a*. The rods F and G form together a toggle-joint, as is apparent from Fig. 2.

The lever D may be operated by hand, or may be attached in a suitable manner to a rod reciprocated by a motor of any description.

The operation of the machine is as follows: When the lever is depressed, the pawl K, engaging the teeth of the gear-wheel A, will move the latter, and the link-rod J will bend the toggle-joint formed by the rods F and G and release the pawl I from the ratchet *a* and retract it. When the lever is raised, the pawl K will slip back over the teeth of the gear-wheel A, the toggle-joint will be straightened, and the pawl, being engaged to the ratchet, will continue the motion of the gear-wheel.

Having described my invention, I claim—

1. The combination of the main gear-wheel A, having an internal ratchet and external gear-teeth, the operating-lever, the pawl carried thereby and engaging the external gear-teeth of the wheel A, the link-rod, the pawl carried by the link-rod and engaging the internal ratchet of said wheel A, and toggle-lever connections between the link-rod and the operating-lever, as set forth.

2. In a mechanical motion to convert reciprocatory motion into circular motion, the combination, with the driving gear-wheel having the internal ratchet, *a*, the lever pivoted upon the shaft of said gear-wheel, and the pawl K, pivoted on the lever and engaging the gear-wheel, of the rod F, pivoted to the point of junction of the supporting-bars E, the rod G, pivoted to and forming a toggle-joint with the rod F, the link-rod H, connecting the outer end of the rod G and the shaft of the gear-wheel A, the link-rod J, connecting the lever and toggle-joint, and the pawl I, pivoted on the link-rod H and engaging the ratchet *a*, substantially as specified.

WASSON C. SHOWALTER.

In presence of—
J. H. REED,
H. E. KINNEY.